June 23, 1931. J. H. GOSS 1,811,788
FLOATING TRIM STUD
Filed Oct. 1, 1927 2 Sheets-Sheet 1

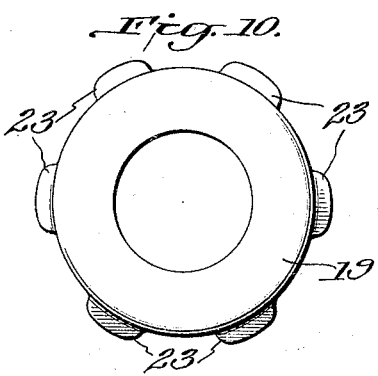
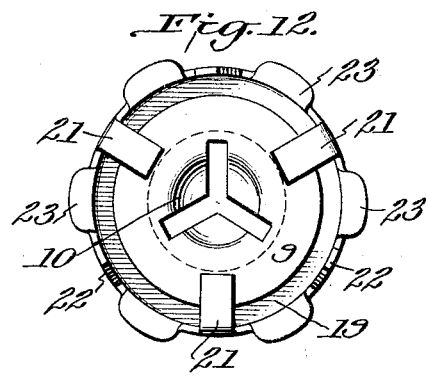
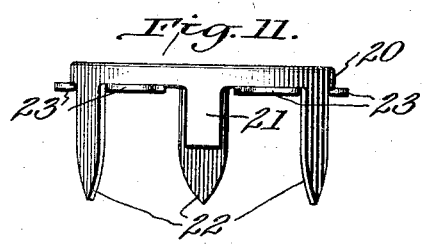
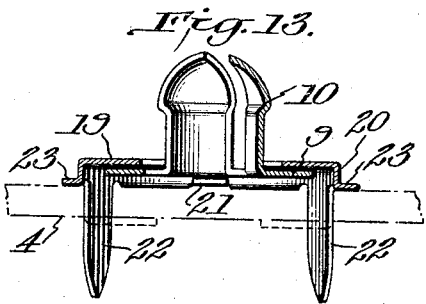

Patented June 23, 1931

1,811,788

UNITED STATES PATENT OFFICE

JOHN H. GOSS, OF WATERBURY, CONNECTICUT, ASSIGNOR TO SCOVILL MANUFACTURING COMPANY, OF WATERBURY, CONNECTICUT, A CORPORATION OF CONNECTICUT

FLOATING TRIM STUD

Application filed October 1, 1927. Serial No. 223,378.

The object of this invention is to provide a stud for use primarily, but not exclusively, in attaching the trimming to automobile bodies which are built of metal, the stud being secured in place in such way that it may move or float on its attaching element to accommodate itself to the location of its complementary socket member, and the stud being attached on the surface of a supporting element, without the necessity of perforating such element for the passage of its head.

The invention consists of a trim stud, preferably of the spring variety, having a flange which is clipped in an attaching element or base in such way as to be freely movable therein or float thereon, and thereby permit the stud to move or float in any direction in order to find its way to the location of the stud-engaging or socket member, the base having attaching prongs by which the device may be set on the surface of the supporting member without the necessity of perforating the supporting member for the passage of the head of the stud, as I will proceed now to explain more fully and finally claim.

In the accompanying drawings illustrating the invention, in the several figures of which like parts are similarly designated, Figure 1 is a section of a portion of a metal frame to be trimmed and a portion of the trimming and an elevation of the floating trim stud of this invention. Fig. 2 is a side elevation, Fig. 3 is a top plan view, Fig. 4 is a bottom plan view, and Fig. 5 is a vertical section, taken in the plane of line 5—5, Fig. 4, of one form of the floating trim stud of this invention, Fig. 5 showing in dotted lines one preferred form of applying the device to a support. Fig. 6 is a side elevation, Fig. 7 is a top plan view, Fig. 8 a bottom plan view, and Fig. 9 is a vertical section taken on line 9—9 of Fig. 8, illustrating another form. Fig. 10 is a top plan view, and Fig. 11 a side elevation illustrating another form of base of the invention. Fig. 12 is a bottom plan view, and Fig. 13 is a vertical section showing the base of Figs. 10 and 11 supplied with the floating stud member.

As already stated, the invention is primarily designed for use in attaching the trimming or trim of metal-bodied automobiles, but it is obvious that it may be applied to other articles where useful. I will describe my invention as applied to automobile bodies; and referring to Fig. 1, the numeral 1 may indicate a cross section of an angular metal door frame of an automobile, having the inturned flange 2 provided with openings 3, which last serve as sockets to engage the heads of the stud members. 4 may represent the cardboard or other supporting member used in trimming the frame, and 5 may represent the trimming of leather, cloth or other material, which is laid over the outer side of the cardboard and its end or edge 6 turned over upon the inner side of the cardboard and confined by the fastening means comprising the socket 3 and a stud, designated generally by the numeral 7.

I have shown herein three forms of such studs, in each of which the head member comprises the slitted spring shank 8, terminating in a flange 9 at one end and a conoidal head 10 at the other end. The flange 9 is only partly slitted. The base of the conoidal head is of greater diameter than the subjacent portion of the shank so that when in normal expanded condition it will overlie the edge of the socket 3, as shown in Fig. 1, and thus insure a positive engagement with the socket.

As shown in Figs. 2 to 5, 11 is the top portion or face of the base member, and this portion is provided with a downturned rim flange 12, and a series of fingers 13 cut in upwardly from the lower edge of the flange and bent inwardly so as to extend beneath the flange 9 upwardly from the bottom of the rim flange 12 to support the head member in the base. The top portion or face 11 is provided with an opening 14 which is of a diameter considerably greater than the diameter of the shank 8 and the conoidal head 10, so as to permit lateral movement in any direction of the head member within its base, as indicated in part by the dotted lines in Figs. 3 and 4, so that when the studs are attached and put in place, the head member may float or move laterally in any direction in order to find the corresponding socket in the frame, in the event that these two portions of the fastening medium should not actually register in the first instance. By these means, it is not necessary to change the location of the stud on its support in the event of failure of the fastening elements to register.

The base is further supplied with attaching prongs 15, depending from the flange 12, and these prongs are adapted to be forced through the supporting member 4 and clinched thereon in order to secure the stud in place. As indicated in Figs. 1 and 5 the base is located on the surface of the supporting member 4 and without the necessity, heretofore common, of perforating the supporting member for the passage of the head of the stud therethrough. When the device is in position as shown in Figs. 1 and 5, the prongs 15 may be clinched by turning them outwardly on the supporting member, as indicated in Fig. 5, or they may be turned inwardly, if desired. The outward turning of the prongs is preferred because there is thus removed one element of potential crushing effect on the fingers 13.

By setting the stud on the surface of the supporting member 4, and having the flange 12 of the base 11 of greater depth than the level of the inturned fingers 13, a blow on the trim would not ordinarily interfere with the level of the fingers 13, and, therefore, the tendency is to preserve the level of these fingers and consequently the freedom of movement of the head member in its base. Incidentally the outward bending of the prongs 15 removes the liability of the fingers being distorted by a blow within the flange of the base and against the flange of the head member, a condition that would likewise interfere with freedom of movement of the head member within its base.

The modification shown in Figs. 6 to 9, inclusive, illustrates practically the same construction as that just described, and having the same mode of operation, excepting that the flange 16 of the base 17 is shorter and the attaching fingers 18 extend from the edges of the flange 16 instead of being cut from these edges and turned in above the edge as in the first described construction.

Other parts of the construction shown in Figs. 6 to 9 are substantially the same as corresponding parts in the form shown in Figs. 2 to 5 and are similarly designated.

As shown in Figs. 10 to 13, the invention may be further modified by means of a base member having a top portion 19 provided with a peripheral flange 20, the edge of which has the stud-supporting fingers 21 and attaching prongs 22, and in addition the laterally extending wings 23, the latter serving as a protection to the stud-retaining fingers when the fastener is set. These wings also enable the base to lie relatively flat against the supporting member or cardboard, with the thickness of the metal as a protection or assurance against the stud-retaining fingers crushing, and presenting a broader face than the rim of the flange itself, thereby eliminating the possibility of the edge of the rim flange cutting into the supporting member or cardboard. It will be understood that these laterally extending wings are an additional safeguard against the crushing in of the stud head supporting fingers, and, as in the case of the two previously described constructions, they prevent the sinking of the base into the supporting member to such an extent as would obstruct the floating of the stud head.

In this modification, of course, the stud head has the same floating capacity as the other forms.

As shown in Fig. 13, the supporting member 4 is represented in dotted lines, and the attaching prongs are shown clinched inwardly, instead of outwardly as in Fig. 5, although either form of clinching may be used, as already indicated. The modification shown in Figs. 10 to 13, both inclusive, is claimed in a division of this application filed October 8, 1928, Serial No. 311,023, now Patent No. 1,757,424, dated May 6, 1930.

In the constructions herein shown and described, the stud and its base are located on the inner side of the supporting member 4, so that there is no appreciable projection on the opposite side which would tend to produce humps or protuberances in the trim or trimming material. This is an advantage incident to my constructions and one of considerable importance. Another advantage is that the floating capacity of the stud is practically permanently preserved and with little or no exposure to impairment.

Variations in the details of construction are permissible within the principle of the invention and the claim following.

What I claim is:—

A floating trim stud, having a head member comprising a shank having a head at one end and a flange at its opposite end, and a base provided with a central opening of considerably greater diameter than the diameter of said shank and a flanged rim provided with inturned fingers formed by cutting into the flange so that the fingers when bent inwardly are spaced from and out of contact with a support, with the free edge of the flange abutting said support, thereby to support the head member above the level of the lower level of the rim flange and permit freedom of lateral motion of the head member within its base so as to accommodate the head member to its complemental socket member, and attaching prongs extending from the lowermost edge of the rim flange in a direction away from the head member, so that the device may be located on the inner or unexposed side of said support and thereby avoid protuberances on the outer or exposed side.

In testimony whereof I have hereunto set my hand this 29th day of September A. D. 1927.

JOHN H. GOSS.